L. BERZON AND J. BREZIN.
ICE CREAM CONE BAKING MACHINE.
APPLICATION FILED MAR. 17, 1921.

1,432,049.

Patented Oct. 17, 1922.
4 SHEETS—SHEET 1.

WITNESS:
Rob R Kitchel.

INVENTORS
Louis Berzon
Joseph Brezin
BY
Frank S. Busser
ATTORNEY.

INVENTORS
Louis Berzon
Joseph Brezin
BY Frank L. Busser
ATTORNEY.

WITNESS:

L. BERZON AND J. BREZIN.
ICE CREAM CONE BAKING MACHINE.
APPLICATION FILED MAR. 17, 1921.

1,432,049.

Patented Oct. 17, 1922.
4 SHEETS—SHEET 4.

WITNESS:

INVENTORS
Louis Berzon
Joseph Brezin
BY
Frank S. Busser
ATTORNEY.

Patented Oct. 17, 1922.

1,432,049

UNITED STATES PATENT OFFICE.

LOUIS BERZON AND JOSEPH BREZIN, OF PHILADELPHIA, PENNSYLVANIA, ASSIGNORS OF ONE-THIRD TO LOUIS BERZON, ONE-THIRD TO JOSEPH BREZIN, AND ONE-THIRD TO WILLIAM KOSAKOFF, ALL OF PHILADELPHIA, PENNSYLVANIA.

ICE-CREAM-CONE-BAKING MACHINE.

Application filed March 17, 1921. Serial No. 452,976.

*To all whom it may concern:*

Be it known that we, LOUIS BERZON and JOSEPH BREZIN, citizens of the United States, residing at Philadelphia, county of Philadelphia, and State of Pennsylvania, have invented a new and useful Improvement in Ice-Cream-Cone-Baking Machines, of which the following is a full, clear, and exact description, reference being had to the accompanying drawings, which form a part of this specification.

Our invention relates to machines for baking pastry cones such as are used in connection with the sale of ice cream and popularly known as ice cream cones.

The invention is more particularly adaptable to machines of the hand-operated type and contemplates, as one of its objects, the combination of novel elements to produce a complete machine for baking cones.

Further objects of our invention are to provide female mould members which may be bodily removed from the machine for cleaning, by merely lifting them out, and to provide novel means whereby the female moulds may be raised and separated to completely free the cones, when baked, in order that they may be readily removed.

Further objects of our invention are to provide novel means for locking the male and female mould members in position during the baking operation and for removing the male mould members from the female members when the baking operation is complete.

A further object of our invention is to provide means for centering and maintaining centered the male mould members in the female mould members.

We will now describe in detail a preferred embodiment of our invention with reference to the accompanying drawings, in which—

Referring to Figures 1 to 6 inclusive:

Standards $a$, $a$, secured to the floor, are provided for the support of the machine. To the standards $a$, $a$, are journaled opposite ends of a pair of hollow shafts $b$, $b'$, collars $c$, $c'$, being secured to shafts $b$, $b'$ to prevent end play.

To the adjacent ends of shafts $b$, $b'$ are secured a pair of polygonal frame members $d$, $d'$ between which are secured hollow spacing blocks $e$, having beveled lips $f$ adjacent their upper edges, between which the female mould members are adapted to be supported. The particular machine here described is provided with six sets of female moulds. Therefore the frame members $d$, $d'$ are made twelve sided and six spacing blocks are used, spaces being left for the moulds between the spacing blocks.

Figures 3, 4, 5:
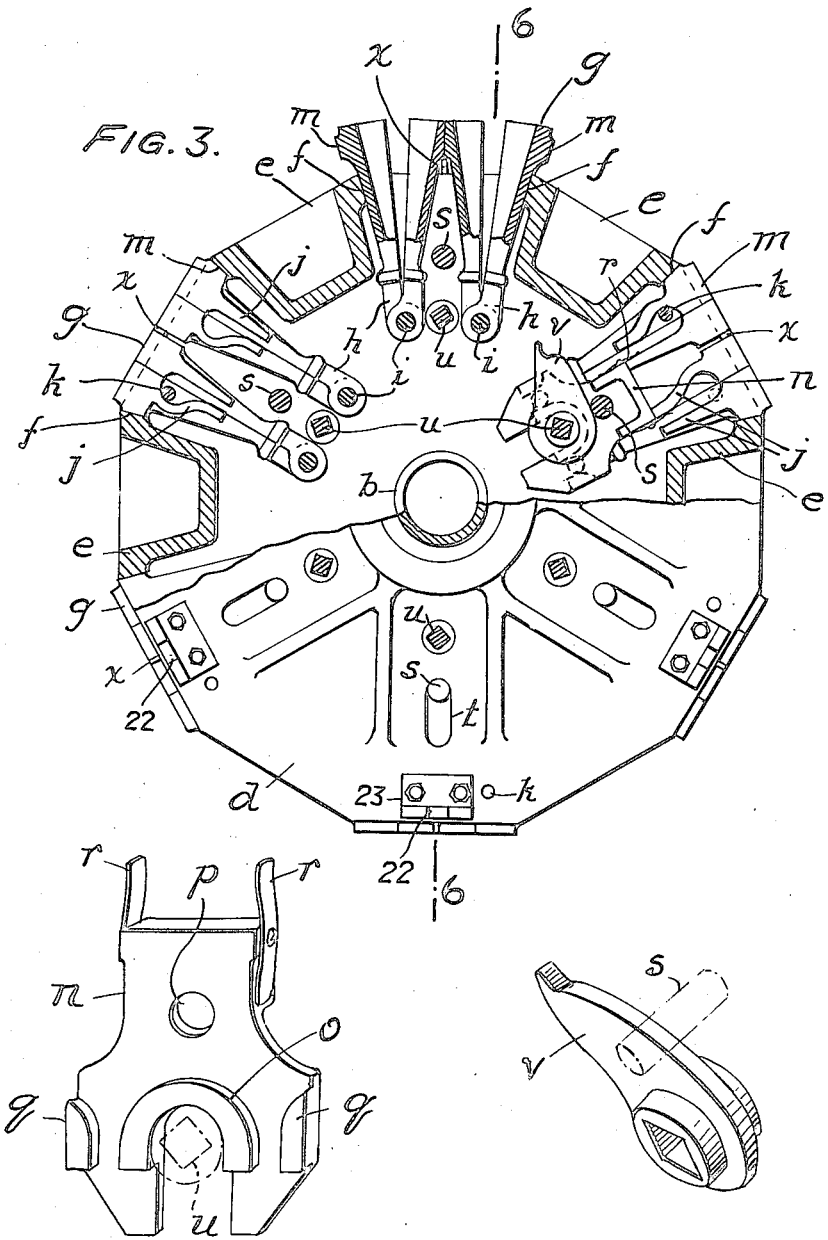
Fig. 3 is an end view, partly broken away, of the mould support and female mould members.
Fig. 4 is a detail view of an element of the female mould member lifting device.
Fig. 5 is a detail view of a mould lifting cam.

The female mould members $g$ are made in two sections, each provided at the bottom, adjacent the ends with ears $h$ having a hole drilled through them, the ears being so offset on the separate sections of the mould member as to coincide when the sections are together and permit the sections of the mould to be pivotally secured together by means of pin $i$. The ends of the mould members are provided with ears $j$ between which extend pins $k$ secured in the frame members $d$, $d'$. The female moulds are placed between the frame members $d$, $d'$ in pairs, as shown in Figure 3, and supported by beveled lips $m$, on the outside sections of the mould members respectively, which bear on the beveled lips $f$ of the separating blocks $e$.

Against each end of each pair of female mould member is placed a casting $n$ provided with a cut out portion about the upper end of which extends an arcuate flange $o$ above which is drilled a hole $p$. The face of the casting is provided with lugs $q$, oppositely disposed, adjacent its edges, and a pair of flat springs $r$ are secured to opposite side edges, adjacent to and extending beyond the upper edge of the casting.

The castings at each end of the pair of mould members are supported by a rod $s$ which passes through the hole $p$ in the castings and extends through radially extending slots $t$ in the frame members $d$, $d'$. The upper edge of the castings bear against the lower edges of the ears $j$ and the springs $r$ extend into the ears bearing against adjacent surfaces thereof and tending to keep the two moulds of the pair together, as shown in Fig. 3. The pivot pins of the two mould members lie between the arcuate flange $o$ and the lugs $q$ which act to guide the mould member. A cam rod $u$ extends through the frame members $d$, $d'$ and through the cut out portions of the castings. Cams $v$ are secured to the rod outside of the castings and are positioned to act on the rod $s$. The cam rod is extended a substantial distance beyond the frame member $d$ and is provided at its end with a handle $w$.

Secured between frame members $d$, $d'$ in a position to lie between the adjacent edges of the female mould members of each pair with its upper edge flush with the surface of the mould members, is a narrow strip $x$ which serves to space the mould members of each pair apart against the action of springs $p$, when the moulds are in baking position.

It will now be observed that the female mould members in pairs, each composed of two pivotally connected sections, are supported in the rotatable frame by the bearing of their lips against lips formed on the spacing blocks, and they are so supported during the baking operation. When the baked cones are to be removed, the cam rod is turned by means of its handle, thus causing the cams to act on rods $s$ which are raised, traveling in the slots $t$ in the frame, and through the casting $n$, the upper edge of which bears against the bottom of ears $j$, the mould members are raised away from the lips on the spacing blocks. As the mould members are raised, the pins $k$ extending between ears $j$ separate the sections of each mould member and as the members are further raised, the adjacent edges of the adjacent sections of the pair of mould members rise clear of the strip $x$ and are moved toward each other under the influence of the springs $r$, thus effecting a further separation of the sections of each mould member.

Figure 6:
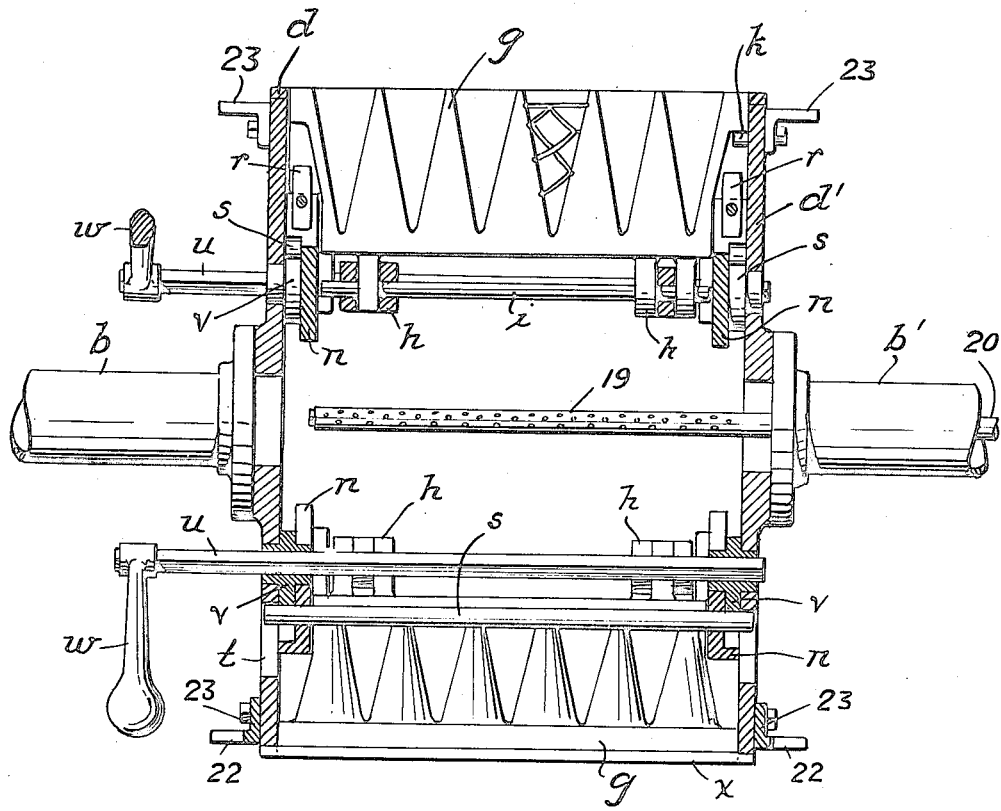
Fig. 6 is a cross-sectional view on line 6—6 of Fig. 3 with the female moulds and lifting mechanism shown.

The movement of the adjacent sections of the members toward each other is important in the release of the cones for removal as a unit, since the edges of the cones are ordinarily held together by a skim of batter which, in the well known machines, renders it impossible to remove the cones from the moulds, especially moulds containing inset designs, such as indicated in Figure 6, without a preliminary side movement to free the cones, which breaks the skim and renders it necessary to remove the cones from each mould member separately. The movement of the two adjacent sections of the mould members toward each other releases the cone without breaking the skim and enables the cones from both members to be removed as a unit.

The male mould members $l$, adapted to be inserted in the female mould members with sufficient clearance to allow for the cone, are secured to a plate $y$ to which is secured a rod $z$, the rear end of which is curved and pivoted in a bracket 2 secured to the collar $c'$ on hollow shaft $b'$. A rod 3, forming a handle, extends from the front of the bar $z$ and carries adjacent its end a locking handle 4 pivoted off center, from which depends a ring 5 adapted for engagement with a hook 6 secured to a collar 7 on the hollow shaft $b$. The locking handle 4 serves to lock the male moulds in position in the female mould members and at the same time, through the plate $y$, to lock the female mould members in position in the frame during the rotation of the frame while baking.

Figure 1:
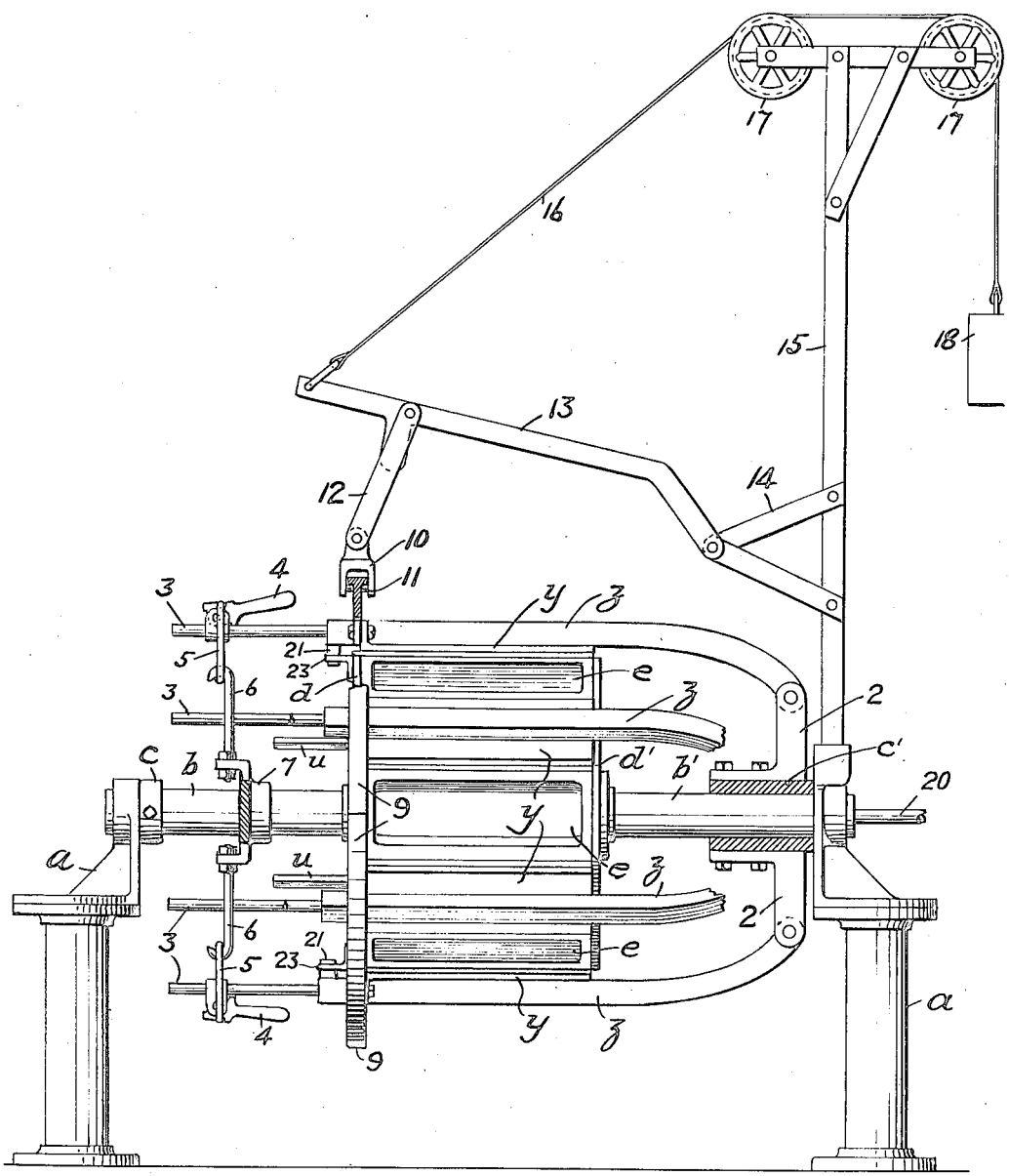
Fig. 1 is a side elevation of the machine embodying our invention and its supporting means partly broken away.
Figure 2:
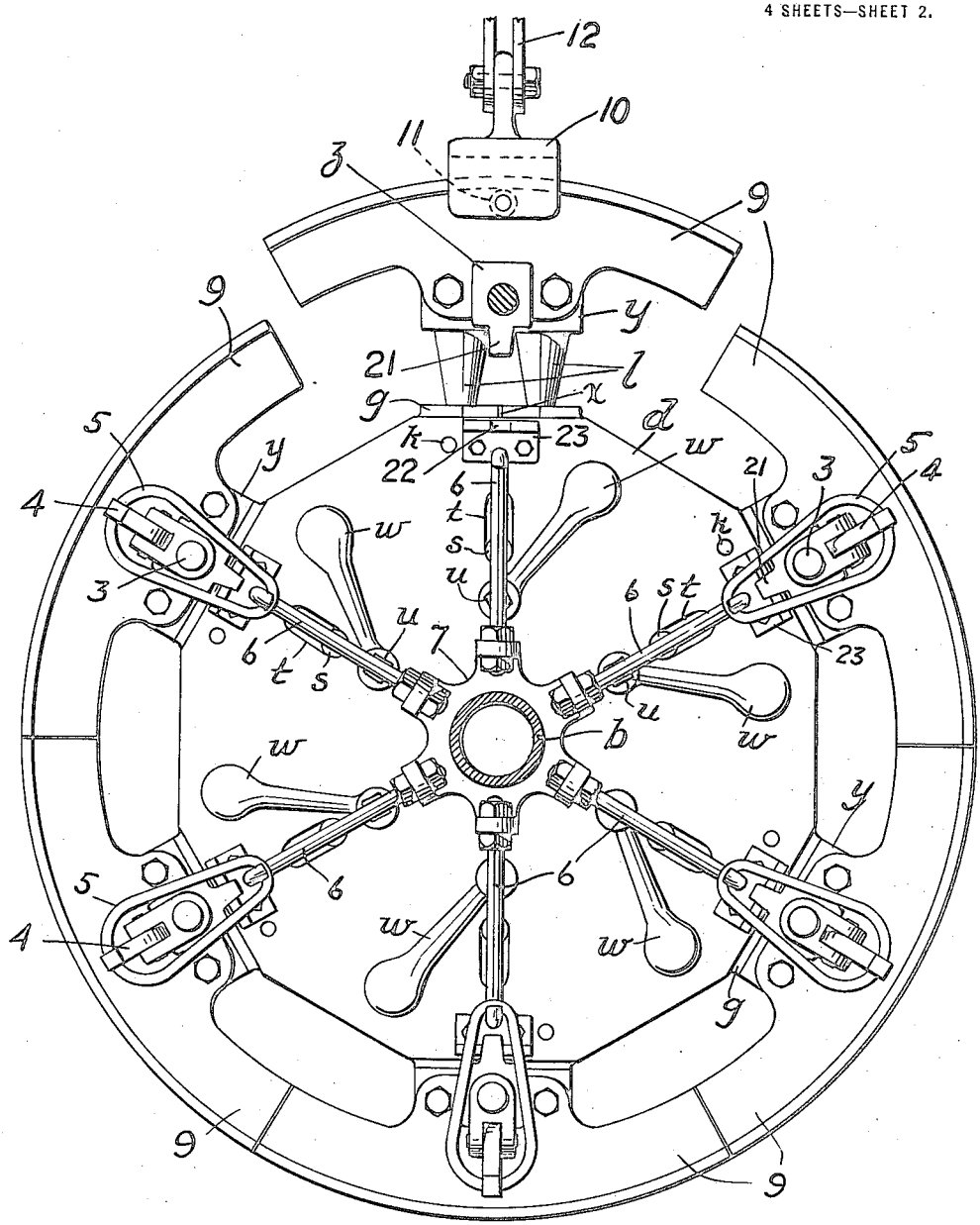
Fig. 2 is a detailed end view of the machine as shown in Figure 1.

Secured to a flange on the plate $y$ is a sector of T rail 9, which with similar sectors, secured to the plates supporting the male mould members for the remaining sets of female mould members, forms a circular track as shown in Fig. 2.

A clock 10 extends over the flange of rail 9 and is provided with a pair of rollers 11 which engage and are adapted to travel on the underside of the flange of the T rail. The block 10 is pivotally connected to a link 12, which, in turn, is pivoted to a lever 13. One end of the lever 13 is pivoted to a pair of brackets 14, extending from a standard 15. A cable 16 is secured to the other end of lever 13, led over a pair of wheels 17, journaled to a cross arm secured to the standard 15, and carries a counterweight 18.

The male mould members are centered in the female members by means of depending lugs 21 depending from the forwardly projecting end of bars $z$, which are adapted to enter slots 22 in angle-pieces 23 secured to the frame member $b$ adjacent the upper edge of each pair of female mould members.

It will now be understood that at the completion of the baking operation the male mould members are unlocked and removed from the female mould members by manipulation of the locking handle 4 and raising the male mould members by means of the handle formed by rod 3. The raising operation being facilitated by the counterweight 18.

The machine is heated and the baking effected by means of an ordinary type burner 19 extending along the axis of the machine and supplied with fuel through a pipe 20 passing through the center of hollow shaft $b'$.

Figures 7, 8:
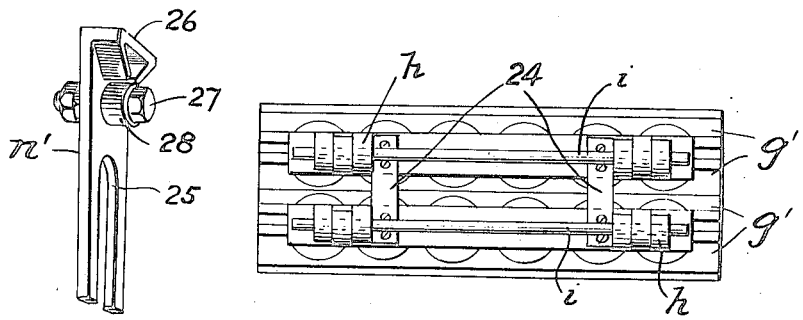
Fig. 7 is a view looking upward at the bottom of a modified form of female mould assembly.
Fig. 8 is a detail view of a modified form of an element of the female mould member lifting device.

Referring now to Figures 7 and 8 in which we have illustrated modifications: the female mould members $g'$ of each pair are secured together by means of flat springs 24 secured to the bottom of the mould members. The springs 24 tend to hold the members of a pair together and draw the adjacent sections together when the mould members are raised sufficiently to cause their edges to clear the bar $x$, as do the springs $r$ heretofore described, which may be eliminated by the use of springs 24.

The castings $n'$ having a flange 26 at its upper end is provided with a cut-out portion 25 above which is drilled a hole through which is threaded a stud 27 upon which is carried a roller 28. Castings $n'$ are positioned at the ends of the female mould members in the same manner as are the castings $n$ heretofore described, the studs 27 taking the place of rods $s$. The cam rod $u$ carrying cams $v$ extends through the cut-out portions of the castings and the cams bear on the rollers 28 carried by the studs 27, so that a rotation of the cam shaft will cause the cams to lift the female mould members through the castings.

It will be understood that the machine herein described comprises six sets of male and female moulds spaced apart by spacing blocks, all identical and disposed about the axis of the shafts $b, b'$.

In the operation of the machine for baking cones, the burner 19 is lit and the machine thoroughly heated. When the machine is heated, the topmost set of male mould members is released and raised, batter is charged into the female mould members, the male members lowered and locked and the machine revolved to bring the next set of moulds uppermost which is charged in the same manner. When the machine has made one revolution and the first set of moulds charged is again uppermost, the male members are released and raised and the female members are raised causing the sections to separate and release the cones, which are removed, as described, the female members are then lowered and charged as before. The charging, baking and removal operations are then carried on continuously, the machine being so arranged to effect the baking of the cones in each set of moulds successively in one revolution of the machine.

Having now fully described our invention, what we claim and desire to protect by Letters Patent is:

1. An ice cream cone baking machine comprising a rotatable support, a plurality of female mould members supported substantially radially about the axis of rotation of said support, a plurality of male mould members, said male mould members being normally within said female members but adapted to be retracted therefrom and re-entered therein, and means automatically engaging said male members and adapted to act to counterbalance said members in their movement of retraction and re-entry.

2. An ice cream cone baking machine comprising a rotatable support, a plurality of female mould members supported substantially radially about the axis of rotation of said support, a plurality of male mould members adapted to be entered and retracted from said female members, and means automatically engaging said male members successively and adapted to act to counterbalance said members in their movement of retraction and re-entry.

3. In an ice cream cone baking machine, the combination with a fixed support and a rotatable support, of female mould members arranged in pairs, male mould members adapted to enter said female members, means separating the female moulds of a pair, and means adapted to raise said pairs of female moulds clear of said separating means.

4. In an ice cream cone baking machine, the combination with a fixed support and a rotatable support, of female mould members arranged in pairs, male mould members adapted to enter said female members, means separating the female moulds of a pair, means adapted to raise said pairs of female moulds clear of said separating means, and means tending to move adjacent sections of adjacent female moulds of a pair together.

5. In an ice cream cone baking machine, the combination with a fixed support and a rotatable support, of female mould members arranged in pairs and supported by said rotatable support, male mould members adapted to enter said female members, means separating the female moulds of a pair, means adapted to raise said pairs of female moulds clear of said separating means, and means tending to move said female members of a pair together.

6. In an ice cream cone baking machine, the combination with a fixed support and a rotatable support, female mould members, each member comprising two sections, supported in pairs by said rotatable support, means separating the upper adjacent edges of said mould members of each pair, means adapted to raise the pairs of female members free of said separating means, and means adapted to act to move adjacent sections of said members together.

7. An ice cream cone baking machine, comprising, in combination, a rotatable support, moulds comprising male and female members, said female members being in sections and supported by said support in positions substantially radially of its axis of rotation, means at opposite ends of said members adapted to raise said members, means adapted to split the sections of said members as they are raised, a pivoted support for said male mould members, means to lock said male members in position in said female members, and means tending to raise said male members clear of said female members.

8. An ice cream cone baking machine comprising a rotatable support, female mould members, formed of sections pivotally secured together, supported substantially radially about the axis of rotation of said support, means to lift and split said female members, male mould members pivotally secured to said support about the axis of rotation thereof and adapted to enter said female members, and means to lock said male members in position in said female members, thereby retaining the said female members in position.

9. An ice cream cone baking machine comprising a rotatable support, female mould members, formed of sections pivotally secured together, supported substantially radially about the axis of rotation of said support, means to lift and split said female members, male mould members pivotally secured to said support about the axis of rotation thereof, and adapted to be entered in and retracted from said female members, means to lock said male members in position in said female members, thereby retaining the said female members in position, and means adapted to counterbalance said male moulds during their movement of entry and retraction.

10. An ice cream cone baking machine comprising a rotatable support, female mould members, formed of split sections, supported in pairs substantially radially of the axis of rotation of said support, means separating the adjacent edges of the female members of the pairs, means tending to move the adjacent edges of the pairs together, means to lift the edges of said pairs of female members free of said separating means, and male mould members pivotally secured about the axis of said support and adapted to be entered in said female members.

11. An ice cream cone baking machine comprising, in combination, a rotatable frame, a pair of female mould members, said members being formed of pivotally connected sections, supported radially of the axis of said frame and rotatable therewith, means supported by said frame and adapted to raise said mould members and simultaneously effecting a splitting of their sections, male mould members, adapted to be entered in and retracted from said female mould members, pivotally supported adjacent the axis of said frame and rotatable with said female members, and means adapted to counterbalance said male members during their movement of entry and retraction.

12. An ice cream cone baking machine comprising, in combination, a rotatable frame, female mould members, formed by pivotally connected sections, supported in pairs radially about the axis of said frame, spacers interposed between said pairs of female members, male mould members, adapted to be centered in said female members, pivotally secured about the axis of said frame, and means to lock said male members to said frame and thereby effecting a locking of the said female members.

13. An ice cream cone baking machine comprising, in combination, a rotatable frame, female mould members, formed by pivotally connected sections, supported in pairs radially about the axis of said frame, spacers interposed between the adjacent edges of the female members of a pair, means tending to move the adjacent edges of the female members of a pair together, and means to raise the pairs of moulds to free the adjacent edges of the female members thereof from said spacers.

14. An ice cream cone baking machine comprising, in combination, a rotatable frame, female moulds, comprising sections pivotally secured together, supported in pairs radially of the axis of rotation of said frame, castings engaging the ends of the pairs of female members, a rod extending through said castings and between said female members, a cam rod supported by said frame and provided with a handle at one end, cams carried by said cam rod and adapted to act on said first mentioned rod to lift said pairs of molds, and male mould members pivotally secured about the axis of said frame and adapted for entering into said female members.

15. An ice cream cone baking machine comprising, in combination, a fixed support, a rotatable shaft journaled to said support, a frame member secured to said shaft, female mould members comprising pivotally connected sections arranged radially of said shaft, means for lifting and splitting said female members, adapted to be entered in and retracted from said female members, male mould members pivotally supported about the axis of rotation of said shaft, means adapted to counterbalance said male members, and means connecting said counterbalance with said male members successively in their movement of entry and retraction.

16. A machine for baking ice cream cones comprising, in combination, a fixed support, a rotatable frame, sets of female mould members, formed in two sections pivotally secured together, arranged in pairs about the axis of, and supported by, said frame, male mould members adapted to enter the female mould members, means to raise and separate the sections of the female mould members, and means tending to move adjacent sections of the female mould members of a pair together.

17. An ice cream cone baking machine comprising, in combination, a rotatable frame, female mould members, formed by pivotally connected sections, supported in pairs radially about the axis of said frame, spacers interposed between said pairs of female members, spacers between the adjacent edges of the female members of a pair, means tending to move adjacent sections of the female members of a pair together, means adapted to lift said pairs of female members to clear the adjacent edges from said spacers, and means adapted to act when said female members are lifted to separate the sections thereof.

18. An ice cream cone baking machine comprising, in combination, a fixed support, a rotatable frame journaled to said support, spacing blocks, provided with beveled flanges, supported by said frames at intervals about its axis of rotation, female mould members, formed of pivotally connected sections and provided with beveled flanges adapted for engagement with the beveled flanges on said spacing blocks, supported in pairs between said spacing blocks, a spacer between the adjacent edges of the female members of a pair, means tending to move adjacent sections of the female members of a pair together and to split complementary sections, and means to raise said pairs of moulds to disengage said flanges and free said adjacent edges from said spacer.

19. An ice cream cone baking machine comprising, in combination, a rotatable frame, sectional female mould members loosely supported thereby about the axis thereof, means for moving said female members radially relative to the axis of said frame, means for splitting said female members in their radial movement, male mould members, adapted to be entered in and retracted from the female members and rotated therewith, pivoted about the axis of said frame, means for locking said male members in position within the female members, thereby locking said female members to said frame, and means tending to counterbalance said male moulds in the movement of entry and retraction.

20. An ice cream cone baking machine comprising in combination, a rotatable frame, female moulds, comprising sections pivotally secured together, supported radially of the axis of rotation of said frame, castings engaging the ends of the female moulds, a stud carried by said castings, a cam rod supported by said frame, cams carried by said cam rod and adapted to act on said stud to lift said female members, and male mould members pivotally secured about the axis of said frame and adapted for entry into said female members.

21. An ice cream cone baking machine comprising, in combination, a rotatable frame, female mould members, said members being formed by pivotally connected sections, supported in pairs radially of said frame, tension means connecting said female members of a pair, castings engaging the ends of the female moulds, a stud carried by said castings, a cam rod supported by said frame, cams carried by said cam rod and adapted to act on said stud to lift said female members, and male mould members pivotally secured about the axis of said frame and adapted for entry into said female members.

22. An ice cream cone baking machine comprising, in combination, a rotatable frame, female mould members, said members being formed by pivotally connected sections, supported in pairs radially of said frame, tension means connecting said female members of a pair, spacers between adjacent sections of said pairs, means to raise said female members clear of said spacers, and male mould members pivotally secured about the axis of said frame and adapted for entry into said female members.

In testimony of which invention, we have hereunto set our hands, at Philadelphia, Pa., on this 15th day of March, 1921.

LOUIS BERZON.
JOSEPH BREZIN.